United States Patent [19]

Onda

[11] 4,165,094
[45] Aug. 21, 1979

[54] JUVENILE TOY VEHICLE

[75] Inventor: Isao Onda, Kitamoto, Japan

[73] Assignee: Ageo Industries Co., Ltd., Saitama, Japan

[21] Appl. No.: 803,953

[22] Filed: Jun. 6, 1977

[51] Int. Cl.² ............................................. B62M 1/02
[52] U.S. Cl. ..................................... 280/261; 280/269; 280/282; 297/311; 301/125; 301/111; 308/238; 188/24
[58] Field of Search ............... 280/220, 259, 260, 261, 280/262, 263, 267, 269, 282; 308/238; 301/2.5, 125; 74/594.1, 594.2

[56] References Cited

U.S. PATENT DOCUMENTS

| D. 146,543 | 4/1947 | Hecht | 280/269 |
| 553,453 | 1/1896 | Donnelly | 280/281 X |
| 1,300,501 | 4/1919 | Sorel | 308/238 |
| 2,311,424 | 2/1943 | Weller | 280/261 |
| 3,232,369 | 2/1966 | Holloway | 280/1.11 R X |
| 3,718,344 | 2/1973 | Lohr | 280/269 X |

FOREIGN PATENT DOCUMENTS

| 1223583 | 2/1971 | United Kingdom | 280/269 |
| 1288382 | 9/1972 | United Kingdom | 280/282 |

Primary Examiner—John P. Silverstrim
Attorney, Agent, or Firm—Burns, Doane, Swecker & Mathis

[57] ABSTRACT

Juvenile toy vehicle with a braking arrangement including front and rear axles supporting front and rear wheels, respectively, a pipe frame having the front and rear axles mounted in the front and the rear ends thereof, respectively, a sprocket wheel having a crank shaft provided with a pair of pedals and positioned on the pipe frame, another sprocket wheel rigidly mounted on the rear axle and linked with the crank shaft sprocket wheel by the intermediary of an endless chain, and a steering wheel linked with the front axles to permit change of a running direction of the vehicle.

One of the rear wheels is rigidly disposed on the rear axle for integral rotation with the rear axle sprocket wheel, while the other rear wheel is journaled rotatably on the rear axle. The rear axle and the crank shaft are rotatably supported between an opposed pair of complimentary bush halves which are surrounded and held together by a fixture rigidly secured on the pipe frame.

A distance between the crank shaft or the pedals and a saddle also disposed on the pipe frame can be changed if necessary.

1 Claim, 13 Drawing Figures

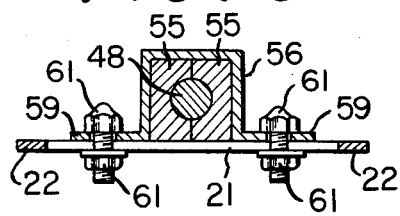
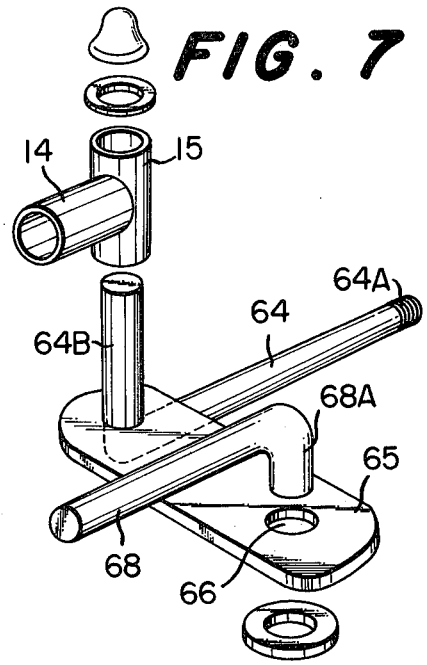
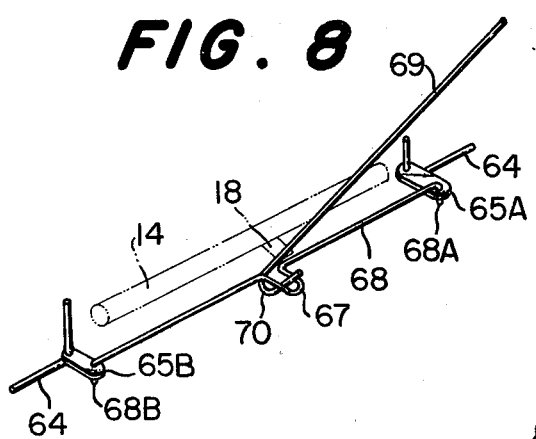
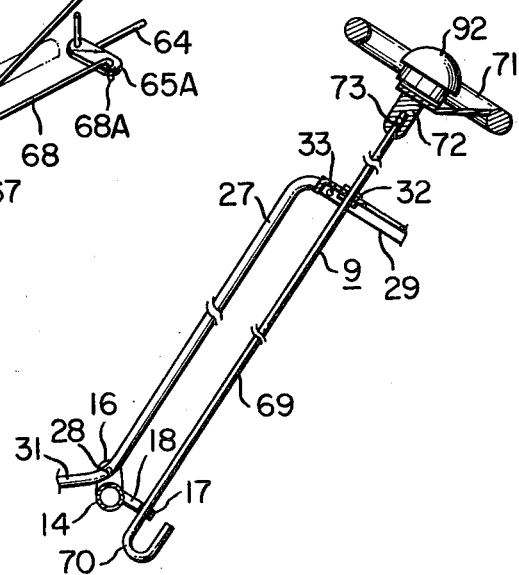

JUVENILE TOY VEHICLE

BACKGROUND OF THE INVENTION

This invention relates to a juvenile toy vehicle and specifically to a juvenile toy vehicle of the type including front and rear pairs of bilateral wheels mounted on a body frame through respective front and rear axles, a sprocket wheel rigid with a pedal crank shaft and linked through an endless chain with another sprocket wheel rigid with the rear wheel axle for transmitting the rotational driving force to the latter, and a steering wheel pivotally mounted on the body and linked with the front wheel axle for transmitting turning movement of the steering wheel to the front wheel axle to permit directional steering of the vehicle.

Juvenile toy vehicles having front and rear pairs of bilateral wheels and adapted to be run by the pedalling operation have been known. Such conventional juvenile vehicles have the drawback that it is difficult to make a turn because they have a pair of bilateral wheels both rigid with a drive axle, thus forming "driving wheels" making the identical rotation. Moreover, in the juvenile vehicles, the axle and the pedal crank shaft are mounted onto the body in a relatively complicated manner so as to render the assembly burdensome and difficult. Further, because the saddle is invariably positioned, it is impossible to accommodate a relative position between the saddle and the pedals to the growing juvenile driver. Additionally, the conventional juvenile vehicles do not have a braking arrangement so that the juvenile drivers are more often than not exposed to hazard.

Accordingly, one object of the invention is to provide a juvenile vehicle in which one of the rear bilateral wheels forms a driving wheel with the other forming an idle wheel to permit the vehicle to run in a sharply curved course, and the saddle and the pedal crank shaft are variably positioned to permit accommodation of a distance therebetween to the growing length of legs of a juvenile driver.

Another object of the invention is to provide a juvenile vehicle in which the body frame is constructed by tubular members, and components or particularly the crank shaft, axles and steering wheel are mounted in a simplified manner so that the number of necessary components and elements is reduced thereby to render manufacture more economical and manufactured product lightweight.

A still other object of the invention is to provide a safety, easily operable juvenile vehicle provided with a braking arrangement.

BRIEF DESCRIPTION OF THE DRAWINGS

FIG. 6 shows a sectional view of the crank bearing with the craft shaft interposed therein;

FIG. 7 shows an exploded perspective view of a connecting arrangement of bearing of front frame member, front axle, and steering piece and rod;

FIG. 8 shows an exploded perspective view of a connecting arrangement of front axle, steering piece and rod, and steering wheel rod;

FIG. 9 shows a sectional view of a mounting arrangement for steering wheel rod;

DESCRIPTION OF THE PREFERRED EMBODIMENTS

The invention will be clearly understood by the following description made with reference to the accompanying drawings.

Figure 1:
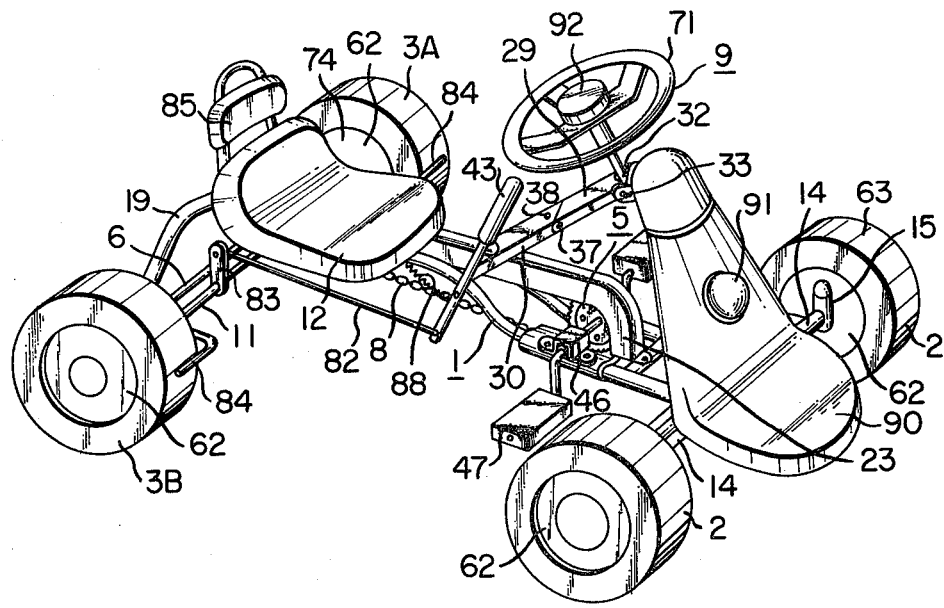
FIG. 1 shows an overall perspective view of a juvenile vehicle according to the invention.

In FIG. 1 showing an overall juvenile vehicle according to the invention, reference numeral 1 designates a pipe frame arrangement forming the vehicle body. A front pair of bilateral wheels are shown as at 2,2; a rear pair of bilateral wheels, as at 3A and 3B. One rear wheel shown at 3A and the other at 3B constitute a driving and an idle wheels, respectively. The reason why one of the rear pair of bilateral wheels is a driving wheel while the other is an idle wheel is because the vehicle provided with rear bilateral wheels rigidly making an identical number of rotation is not permitted to sharply turn during running. Either of the rear wheels may be a driving wheel according to the invention. Reference numeral 5 designates a driving section having an endless chain through which a driving force is transmitted to rear driving wheel 3A. The juvenile vehicle has a steering device 9 and a braking arrangement for braking the rear wheels 3A and 3B.

Figure 2:
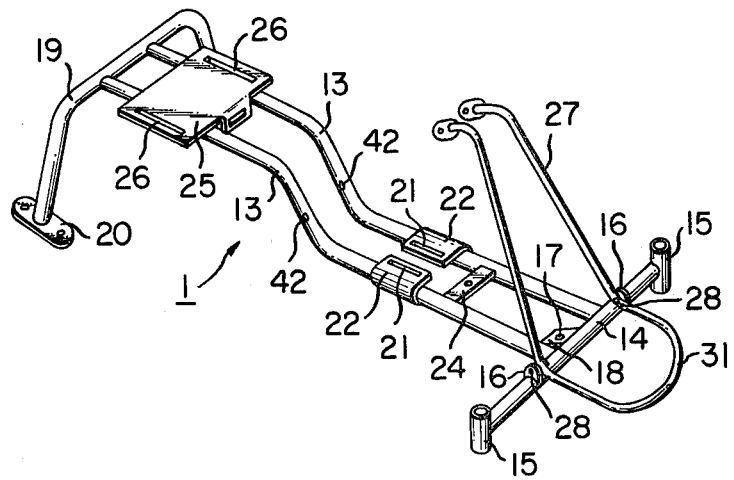
FIG. 2 shows a perspective view of a pipe frame arrangement thereof.

A pipe frame arrangement as shown in FIG. 2 is formed by a pair of tubes 13,13 extending in parallel with each other and having a longitudinal length substantially equivalent to an overall length of the vehicle. The pipe frame arrangement 1 has a front frame member 14 secured at the front end thereof and extending normally and horizontally thereby to define a width of the vehicle. The front frame member 14 is provided at each of the lateral opposed extremities with a hollow sleeve-like bearing 15 extending in a perpendicular direction to the front frame member, and further has a pair of bracket members 16,16 spaced from each other and inward from the sleeve-like bearings and protruding in the upward direction. At the center of the front frame member provided is a steering wheel support piece 18 extending in the slanted downward direction and has formed therein an aperture 17 through which a steering wheel rod extends.

At the rear end of the pipe frame arrangement 1 secured is a rear frame member 19 extending normally and horizontally and having a longitudinal length substantially equivalent to that of the front frame member 14. An axle mount plate 20 is provided at each of the laterally opposed extremities of the rear frame member.

The pair of tubes 13,13 have each a crank shaft bearing base 22 mounted on the upper portion adjacent the front end thereof. The crank shaft bearing bases 22,22 each have an elongated slot 21 formed therein to be positioned between the pair of tubes 13,13 and to extend in parallel with the longitudinal direction of the latter. A case support member 24 is positioned forwardly of the crank shaft bearing bases 22 to transversely connect the pair of tubes 13,13 with each other, and a chain case 23 (see FIG. 1) is supported at the front end by the case support member 24.

A saddle base 25 is provided on the pair of tubes 13,13 adjacent the rear end thereof, and has a pair of elongated slots 26,26 formed therein to be spaced with each other outwardly of the pair of tubes 13,13 and to extend in parallel with the longitudinal direction of the latter.

Figure 3:
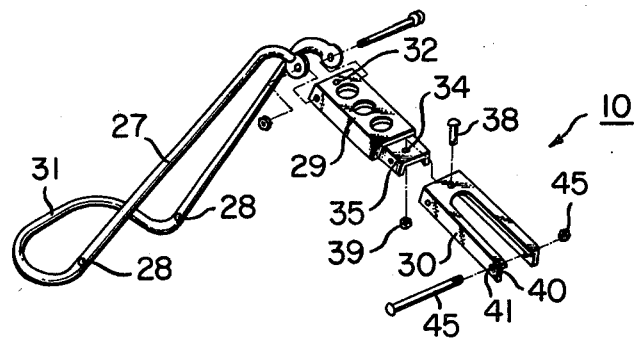
FIG. 3 shows a perspective view of a supplementary frame, said supplementary frame comprising front, intermediate and lower end members.

A supplementary frame shown in FIG. 3 is generally formed in an upwardly curved shape and comprising a front member 27 defining a front sloped side and an intermediate and a lower end members 29 and 30 both defining the rear sloped side of the upwardly curved shape. The front member 27 is formed by a tubular member which is bent generally in a U-like shape with a curvature 31 defining the front lowermost end portion of the front member. The lower curvature is disposed to protrude forwardly from the front frame member 14 (see FIG. 2) so as to function as a bumper. The front member 27 is pivotally secured to the front frame member 14, with its securing pivots 28,28 being engaged with the bracket members 16 (see FIG. 2), and it is preferred to provide the securing pivots 28,28 in immediately adjacent positions of the rectilinear portions to the junctions with the front end curvature of the front member. The front member 27 has the rear end defining a curved uppermost portions 26,26 which have apertures formed therein whereby the intermediate member 29 with a steering wheel rod receiving aperture 32 is turnably pivoted in the front end portion thereof. The intermediate member 29 has a tongue 35 protruding from the lower end thereof, and the lower end member 30 has the front end portion fittingly receiving the tongue 35 to be pivotally secured therein. The lower end member is bifurcated to have an opposed pair of rear end portions 40,40 in each of which a pin aperture is formed. The pin apertures 40,40 are placed in alignment with pin apertures 42 (see FIG. 2) formed longitudinally in the center of the tubes 13,13 and with a pivotal aperture 44 (see FIG. 10) formed in a brake lever 43 (see FIG. 1) and positioned in a slightly lower position of the longitudinal center thereof, and a fixing pivot pin-nut member 45 is extending therethrough.

Figure 4:
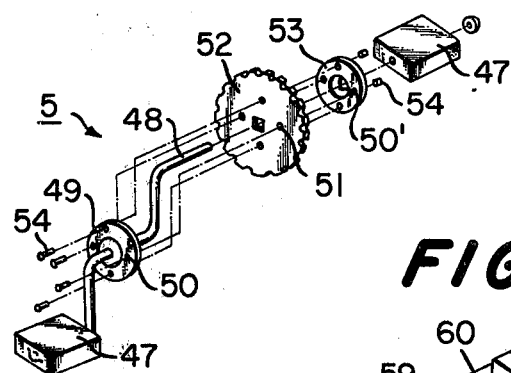
FIG. 4 shows an exploded perspective view of a mounting arrangement of sprocket wheel with pedal crank shaft, thus showing a driving section of the juvenile vehicle.

FIG. 4 shows a driving section of the vehicle in which a crank shaft 48 having a pedal 47 at each of the opposed extremities is provided rigidly in the center with a sprocket wheel mount plate 49. The sprocket wheel mount plate 49 has a plurality of screw apertures 50 formed therein. The same number of screw apertures 51 and 50' are formed in corresponding positions of a sprocket wheel 52 and a sprocket wheel fixing plate 53, respectively. A plurality of locking stud-nut fixtures 54 are extending through the screw apertures 50, 51 and 50' so that the sprocket wheel 52 is rigidly fixed on the crank shaft 48.

Figure 5:
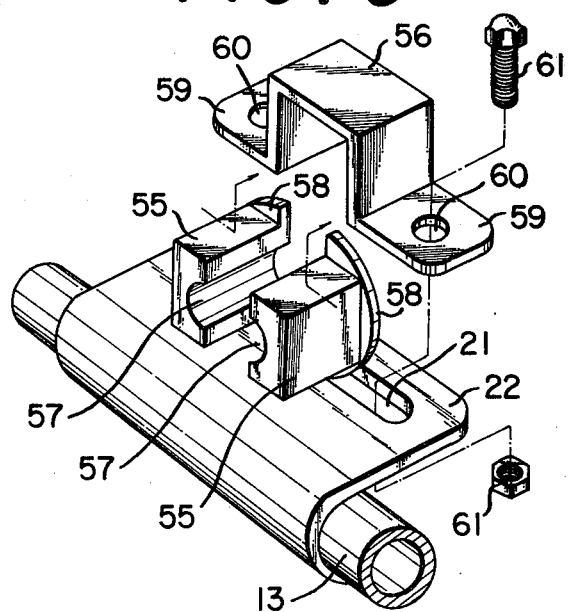
FIG. 5 shows an exploded perspective view of a crank bearing journaling the crank shaft of FIG. 4.

FIG. 5 shows one of bilateral bearings of the crank shaft 48 shown in FIG. 4, the crank shaft bearings being each formed by a pair of complementary bush halves 55 and 55, and a fixture 56 surrounding and holding together the bush halves 55 and 55. The bush halves 55 and 55 each have a sectionally semicircular groove 57 adapted when assembled to form a bearing aperture for therein rotatably receiving the periphery of the crank shaft 48, and a flange 58 formed at one end and having a coplanar side with the side in which the semicircular groove is formed. The bush halves should be made of any material effectively functioning as a lubricant material, such as ethylene tetrafluoride resin, ethylene fluoride resin, etc. To assemble the bearing, the bush halves are placed with the semicircular grooves opposedly facing with each other, and after the crank shaft 48 is fitted in the semicircular groove of one bush half, the bush halves are put together so as to surroundingly interpose the crank shaft 48. The bush halves assembled together with the crank shaft interposed therebetween are capped from upwards by the fixture 56, when the inner rectangular edge of the main body of the fixture 56 is in an abutting contact with the flanges 58 of the bush halves. Mount tongues 59,59 of the fixture 56 are placed on the crank shaft bearing base 22, with through holes 60,60 therein being in register with the elongated slot 21 in which bolts are extending thereby to engage the fixture 56 on the base 22 by means of nuts screwed thereon. Thus, the crank shaft 48 is journaled in bushings and thereby coupled to bearing base 22, as shown in FIG. 6.

FIG. 7 shows a portion of the front frame member 14 which is jointed with one of front wheel axles 64,64. Specifically, the front wheel axle 64 has a first end 64A on which the front wheel is pivotally secured for rotation thereabout. A second end portion 64B of the front axle 64 is bent normally to the horizontal direction of the latter and is received in one of the bilateral sleeve-like bearings 15,15 disposed in the front frame member 14. A steering piece 65 has a first end formed in one piece with the second end portion 64B of the front axle 64 and a second end having formed therein an aperture 66 in which a distal end 68A of a steering rod 68 is engagedly received.

The steering rod 68 in part shown in FIG. 7 is shown in FIG. 8 to have the opposed distal ends 68A and 68B engaged with the steering pieces 65A and 65B, respectively, and to be provided in a position equidistant from the opposed distal ends 68A and 68B with a U-like curved recess 67 for engaging a steering wheel rod 69, or specifically a U-like curved end 70 of the steering wheel rod 69. It is preferred that the distal extermity of the U-like end 70 be engaged in the U-like curved recess.

As shown in FIG. 9, the steering wheel rod 69 extends at the lower portion through the aperture 17 formed in the support piece 18 provided in the center position of the front frame member 14, and the upper portion of the steering wheel rod 69 is inserted through the aperture 32 formed in the intermediate member 29 of the supplementary frame 10, the front frame member 14 having been in detail shown in FIG. 2 and the supplementary frame 10 in FIG. 3. To provide the assembly of FIG. 9, the steering wheel rod 69 is inserted in the aperture 17 of the support piece from downward thereof, and with the U-like end 70 being loosely engaged in the U-like recess 67 formed in the steering rod 68, is caused to get engaged in the intermediate member 29 while the other end of the steering wheel rod is received in a tubular coupler 72 centrally, downwardly projecting from a steering wheel 71 and rigidly fixed therewith by a setscrew 73.

Figure 10:
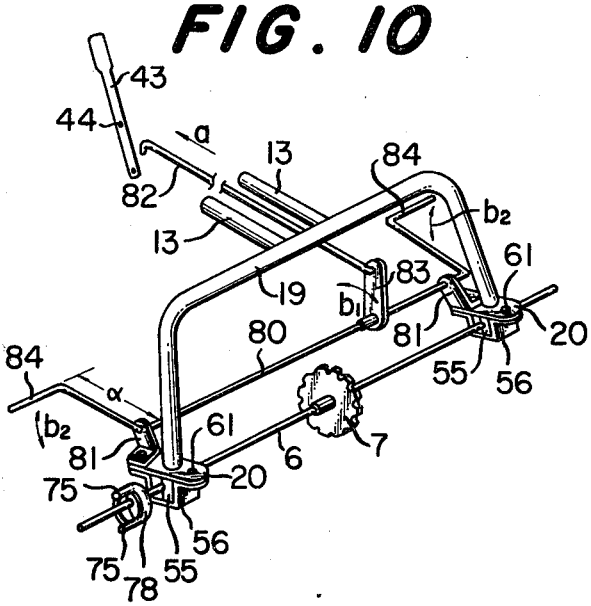
FIG. 10 shows a perspective view of a connecting arrangement of rear frame member in the rear of the pipe frame arrangement with rear axle and part of a braking arrangement.

FIG. 10 shows the details of the rear frame member 19 secured in the rear end of the pipe frame 13. The rear wheel axle 6 having a sprocket wheel 7 rigidly fixed at the intermediate portion is rotatably journaled in the laterally opposed ends on the rear frame member 19. Bearing of the rear wheel axle 6 on the rear frame member is provided substantially in the same manner as that of the crank shaft shown in FIG. 5.

Figure 11:
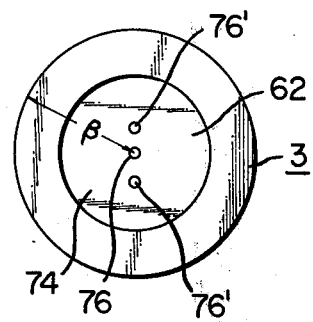
FIG. 11 shows the inside of a driving wheel.

A wheel cap 78 having a plurality of rotational force transmitting pawls 75,75 formed therein to project in the laterally outward direction is rigidly disposed on an end of the side of driving wheel of the rear wheel axle 6. The driving wheel to be disposed on the end of the side of driving wheel of the rear wheel axle has, as shown in FIG. 11, a center bearing aperture 76 for receiving the end of the rear wheel axle 6 and a plurality of apertures 76' for receiving the plurality of rotational force transmitting pawls 75. The driving wheel is thus rigidly disposed on the end of the rear wheel axle 6, with the end of the rear wheel axle 6 being inserted in the center bearing aperture 76 and the rotational force transmitting pawls 76' of the wheel cap 78 being engaged in the plurality of apertures 76'. The driving wheel functioning as one of the rear wheels is arranged to be integrally rotated with the rear wheel axle 6. On the other hand, the idle wheel is journaled through its center bearing aperture on the other end of the rear wheel axle 6 for rotation about the latter. Thus, while the sprocket wheel 7 driven for rotation causes the driving wheel to make integral rotations with the rear wheel axle, the idle wheel can make independent rotations from the rear wheel axle according to a right- and left-hand turning of the vehicle so that a running direction of the vehicle can be facilitatingly changed by the turning operation of the steering wheel.

Still referring to FIG. 10, the brake lever 43 has the lower end connected with a first end of a brake tie rod 82 which has a second end connected with a first end of an actuator lever 83. The actuator lever 83 in turn has a second end rigidly secured on a brake rod 80. The actuator lever is preferably arranged so as to be positioned in an upstanding posture from the brake rod 80 in the inoperative state of the brake arrangement. The brake rod 80 has a transversely extending portion of a somewhat smaller length than the wheel tread of the vehicle, and is provided at each of the laterally opposed end with a bent portion 85 extending substantially at a right angle from the latter in a length α. The bent portions each have a braking portion 84 extending curvedly at a right angle from the distal end thereof. A spring 88 (see FIG. 1) is interposed between the brake lever 43 and one of the frame tube 13 thereby to function in the inoperative state of the brake arrangement to hold the braking portions 84 out of contact with the rear wheels.

Figure 12:
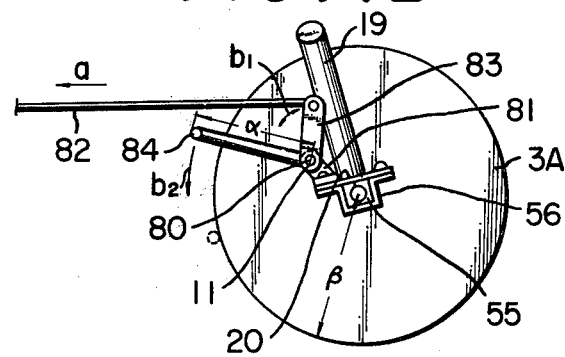
FIG. 12 shows essential part of the braking arrangement for convenience of describing the braking operation.

As shown in FIG. 12, the length α of the bent portions of the brake rod is smaller than a radius β of the rear wheels. Upon operation of the brake lever, the brake tie rod 82 is moved in a direction of Arrow a thereby to cause the brake rod 83 to be turned about bilateral pivot brackets 81,81 in a direction $b_1$, and thus the bent and the braking portions 85 and 84 to be turned about the same in a direction $b_2$ so that the braking portions 84 are placed frictionally in contact with the periphery of the rear wheels to brake the rotational force thereof.

Figure 13:
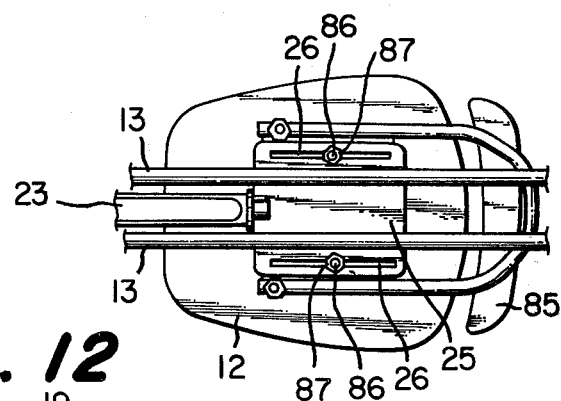
FIG. 13 shows a saddle secured on a saddle base.

FIG. 13 shows a saddle 12 having a back rest 85 and mounted on the saddle base 25. The saddle 12 has a plurality of threaded studs 86,86 projecting from the rear surface thereof and fitted through the elongated slots 26,26. The saddle is thus positioned in any suitable position with nuts 87,87 locking the studs in suitable positions of the elongated slots.

Now, returning to FIG. 1, an endless chain 8 extends between the sprocket wheels 52 and 7 shown in FIGS. 4 and 10, respectively, and the crank shaft is secured in a position of the crank shaft bearing base 22 suitably to provide an adjusted tension to the endless chain. The endless chain is covered in the chain case 23.

A front cover 90 is provided on the front member 27 and has a warning lamp 91 disposed in a suitable center portion thereof. In the rear side of the front cover 90 provided are a buzzer and a casing for housing a dry battery (both not shown). Warning lamp, buzzer and dry battery are electrically connected in a circuit including a horn pad 92 provided in the center of the steering wheel 71 to serve a switch in the circuit.

I claim:

1. A juvenile toy vehicle comprising:

a pipe frame body;

front wheel axle means supported by said frame body and having a first pair of bilateral wheels mounted adjacent opposed ends, said front wheel axle means including a pair of front wheel axles each formed by a one-piece member having a horizontal and upstanding portion and a steering piece extending rearwardly from proximal end of said upstanding portion;

rear wheel axle means supported by said frame body and having a rear pair of bilateral wheels mounted adjacent opposed ends, said rear wheel axle means including an axle, a wheel cap provided with a plurality of rotational force transmitting pawl means rigidly mounted laterally outside of the positions at which said rear wheel axle means is journaled, one of said first pair of bilateral wheels being provided with a central aperture for receiving the end of said axle and a plurality of apertures for receiving said plurality of rotational force transmitting pawl means, said one rear wheel being fitted on said end of said rear axle means with said apertures aligned and receiving said rotational force transmitting pawl means thereby to form a driving wheel making integral rotations with said rear wheel axle means, the other of said rear bilateral wheels being loosely fitted on the other end of said rear wheel axle means to form an idle wheel;

a sprocket wheel rigidly carried by said rear axle means;

a pedal crank shaft carried by said body frame, said pedal crank shaft being carried by a bearing device including a pair of complementary bushing half members rotatably receiving said shaft therebetween, a supporting plate carried by said body, and a bushing member retaining device for removably attaching said bushing half members to said supporting plate;

a second sprocket wheel rigidly carried by said pedal crank shaft;

an endless chain linking said first sprocket wheel with said second sprocket wheel;

braking means including a brake rod having crank-like curved, laterally opposed ends carried by said body at the rear thereof, so that the distal end portions of said brake rod are placed frictionally in contact with the periphery of said rear wheels when said brake rod is manually rotated;

a saddle adjustably carried by said frame body; and,
a steering device operatively linked with said front wheel axle means, said steering device including a steering rod having a coplanar U-shaped curvature in the intermediate portion thereof and the vertical, laterally opposed ends thereof loosely received in an aperture in each of said steering pieces, a steering wheel support piece disposed in the intermediate portion of said body at the front thereof, a steering wheel rod having an upper portion rotatably extending through an aperture of said steering wheel support piece and a U-shaped distal end portion in which said U-shaped curvature of said steering rod is loosely engaged.

* * * * *